Dec. 4, 1956      M. E. DOWNS      2,772,482
PROPORTIONAL DIVIDERS

Filed Oct. 6, 1953

INVENTOR
MAURICE E. DOWNS
BY
Mason & Graham
ATTORNEYS

United States Patent Office 2,772,482
Patented Dec. 4, 1956

2,772,482

PROPORTIONAL DIVIDERS

Maurice E. Downs, Huntington Park, Calif.

Application October 6, 1953, Serial No. 384,404

1 Claim. (Cl. 33—150)

This invention has to do with proportional dividers.

Conventional proportional dividers comprise a pair of legs, pointed at each end, which are pivotally connected intermediate their ends by a joint which can be adjustably set at any place along the legs to give the desired ratio or proportion. This type of proportional dividers has several disadvantages, one being that, in use, since the ends of the legs are pointed, and the instrument must be upright with respect to the working surface, there are always two needle-sharp points extending toward the draftsman's eyes thereby presenting both a mental and physical hazard. Another disadvantage is that the reach of the instrument varies with each setting or change of proportion. A further disadvantage is that for each measurement the instrument must be reversed end for end. Still another disadvantage is the fact that the adjustable pivotal connection between the legs tends to wear and become loose with consequent loss of accuracy of the instrument. Also, if the instrument is too firmly held, there is a tendency to move the legs out of adjustment.

An object of my invention is to provide a novel, improved proportional dividers which does not have the above-noted disadvantages of the conventional type of proportional dividers.

Another object is to provide a novel, accurate proportional dividers instrument of simple construction which is easy to use. In this connection it is a particular object to provide an instrument embodying a pair of pivotally mounted legs carrying indicating points which extend at right angles or normal to the longitudinal axes of the legs rather than as a continuation of the ends of the legs thereby enabling the use of the instrument with the legs disposed generally parallel to the paper or working surface whereon the measurements are being taken.

Still another object of the invention is to provide a proportional dividers instrument in which there is provided a permanent pivotal point or hinged connection between two legs and wherein the indicating or measuring points are adjustable along the legs and all the indicating points are located on the same side of the pivotal connection between the legs.

Another object is to provide a compact instrument of the type indicated which can be readily adjusted and which has the same maximum reach for all adjusted positions.

A still further object is to provide an instrument which can be readily manufactured.

These and other objects will be apparent from the drawing and the following description.

Referring to the drawing.

Figure 1:
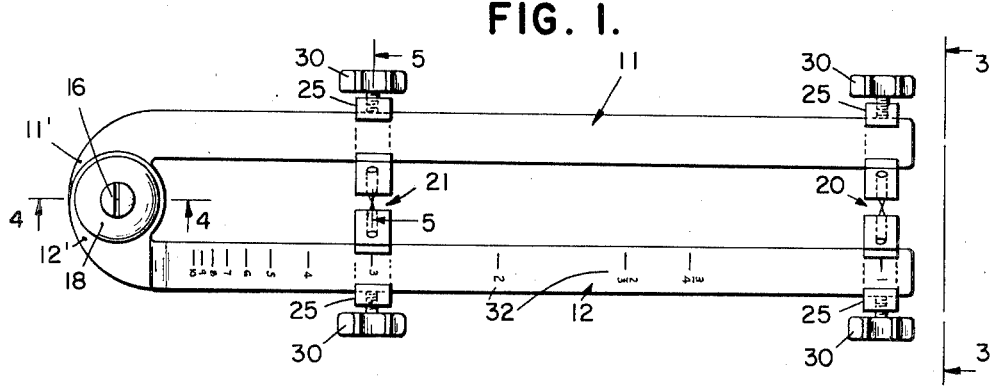
Fig. 1 is a plan view of an instrument embodying the invention.
Figure 2:
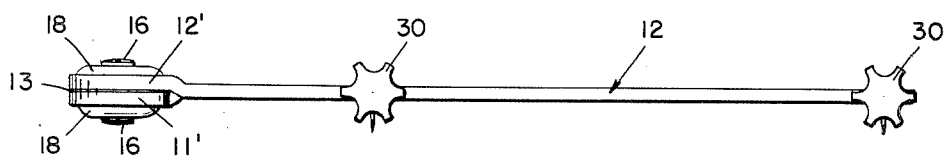
Fig. 2 is a side elevational view of the device of Fig. 1.
Figure 3:
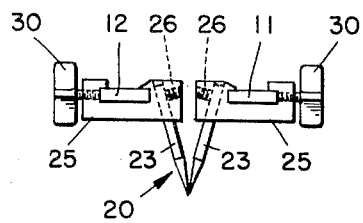
Fig. 3 is an end elevational view in the general direction indicated by line 3—3 of Fig. 1.
Figure 4:
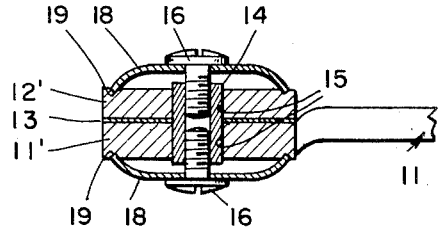
Fig. 4 is a sectional view on an enlarged scale on line 4—4 of Fig. 1.
Figure 5:
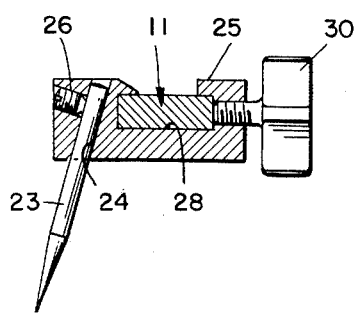
Fig. 5 is an enlarged sectional view on line 5—5 of Fig. 1.

More particularly describing the invention, the proportional dividers instrument comprises a pair of corresponding straight legs, indicated by 11 and 12. The legs have laterally projecting, apertured end portions 11' and 12', respectively. These portions 11' and 12' are offset above and below, respectively, of the remaining portion of the legs sufficiently to permit of the main portions of the legs lying in the same planes with the legs pivotally connected, as will be apparent from the following description. A disk washer 13 is employed between the end portion 11' and 12' and the parts are connected by a central bushing 14 received in apertures 15 and a pair of screws 16 threadedly mounted in the bushing. A circular spring plate 18 is interposed between the head of each screw and the surface of the end portion of a leg, the plate 18 being received within a circular recess 19 in the face of the end portion of the leg.

With the construction described the two legs 11 and 12 may be pivoted to a position such that they lie parallel to each other as shown in Fig. 1 and in this connection the legs are shown as being rectangular in cross section although this is not essential. Also, the spring plates 18 enable the proper adjustment of the joint to give the desired frictional resistance to turning.

At their outer or free ends the legs are fitted with a pair of primary pointers or indicators generally indicated by 20 and in the normal use of the instrument these pointers may be regarded as permanently located on the legs in the position shown although for convenience they have been illustrated as adjustable and removable. The legs are also fitted with a pair of secondary pointers generally indicated by 21, these being adjustable longitudinally along the legs. In each case the pointers comprise a pin 23, preferably pointed, which is secured in a bore 24 provided in a block 25 by means of a set screw 26. The block 25 is formed with a somewhat T-shaped slot or channel 28 which slidably receives the leg, the latter being rectangular in cross section, and an adjustment screw 30 is provided for securing the block in adjusted position on the leg. The bore 24 is angularly disposed whereby each pin 23 projects laterally of the leg a distance such that when the legs 11 and 12 are parallel the pins 23 of both sets of pointers 20 and 21 are disposed in alignment upon a line which is midway between the two legs and passes through the pivotal axis thereof.

The legs 11 and 12 are provided with suitable indicia indicated by 32 to facilitate setting of the adjustable points 21 at any given proportion of the distance from the pivotal axis of the legs to the sationary points 20.

In use the secondary points are set at a given point along the legs to give a required proportion or ratio. For example they may be set at the indicia marks "2", or halfway between the primary points 20 and the pivotal axis of the legs to give a proportion of 2:1. It will be apparent that by pivotally moving the legs to separate the points 20 and 21 the desired set of points is utilized to obtain a given measurement and the other set of points will then give the proper proportional measurement, either greater or smaller in accordance with which set of points is originally used and in accordance with the setting of the points 21 along the legs. Since the pins 23 are angularly disposed, the points thereof are readily visible from above, making it easy to use the instrument accurately.

Although I have illustrated and described a preferred form of my invention, I contemplate that various changes and modifications can be made without departing from the invention, the scope of which is indicated by the following claim.

I claim:

A proportional dividers instrument comprising a pair of legs each having a straight main portion and a laterally projecting end portion, means pivotally connecting said end portions for movement of the legs substantially in a common plane, the pivotal axis being laterally offset from the inner sides of the legs whereby said legs may be disposed in parallel, spaced relation, a pin-holding block slidably mounted on the main portion of each leg, inter-engaging means on the block and leg preventing rotation of the block about the leg, means in each block for engaging the leg upon which the block is mounted for releasably holding the block in a given position on the leg, a pin in each block, the pin in each block projecting in a plane at right angles to the leg and disposed angularly inwardly of the leg at an angle of less than 90° to the plane of movement of the leg, and a pin mounted adjacent the free end of each leg, said last-mentioned pins projecting respectively corresponding to said first-mentioned pins, all of said pins projecting to one side of the instrument, said pins being so disposed that their outer ends are substantially in alignment midway between the legs on a line passing through the pivotal axis of the legs when the legs are parallel.

References Cited in the file of this patent

FOREIGN PATENTS

| | | |
|---|---|---|
| 4,163 | Great Britain | Mar. 17, 1888 |
| 131,142 | Great Britain | Aug. 14, 1919 |
| 267,936 | Italy | Sept. 26, 1929 |